Patented Sept. 27, 1932

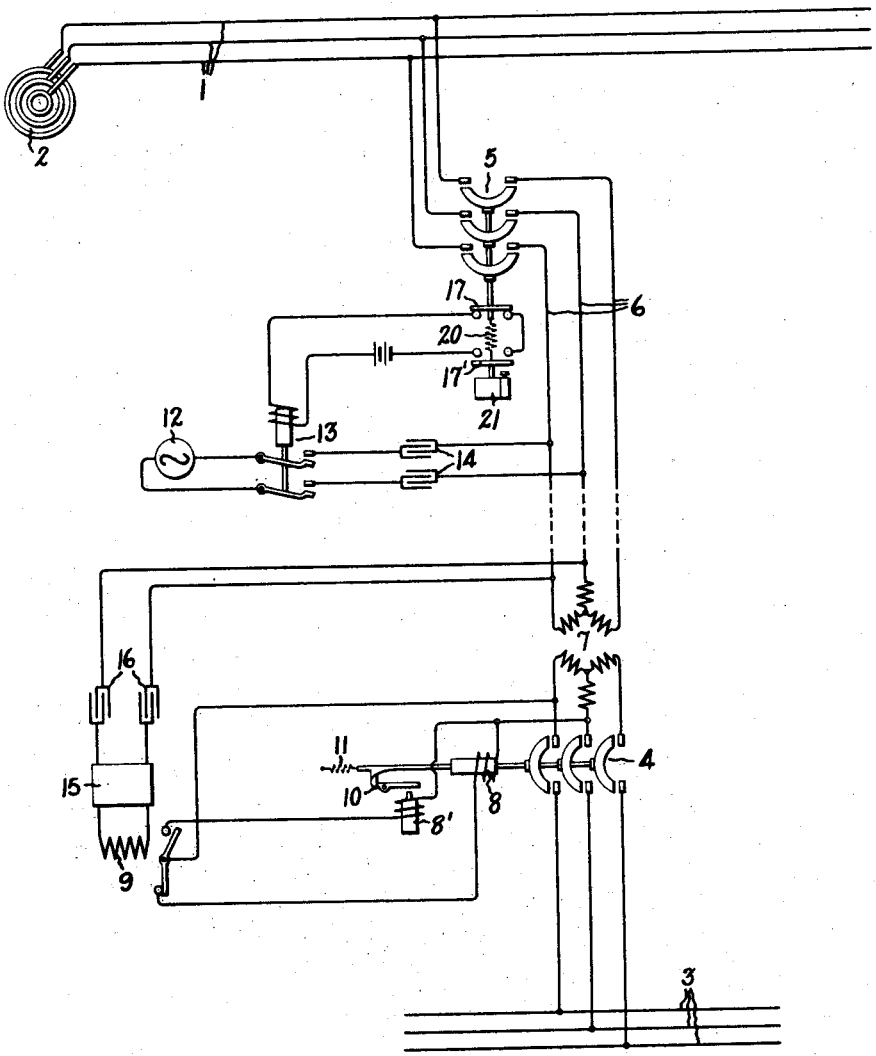

1,879,292

UNITED STATES PATENT OFFICE

BENJAMIN W. JONES, OF SCHENECTADY, NEW YORK, ASSIGNOR TO GENERAL ELECTRIC COMPANY, A CORPORATION OF NEW YORK

MEANS FOR CONTROLLING A POWER SWITCH

Application filed April 16, 1929. Serial No. 355,543.

My invention relates to means for controlling a power switch, and more particularly to improved means for controlling a power switch which may be located in a portion of a line near the load in response to the position of a power switch arranged in the line near the power source.

Means have been proposed heretofore for controlling a remotely located switch as, for example, the network switches in a feeder circuit of a power distribution system, in response to the position of a switch near the source by means of carrier currents supplied to the line dependently upon the position of the controlling switch.

In carrying my invention into practice I propose to supply control current, which may be in the form of high frequency current transmitted over the line conductors to a remote receiving device for a short interval of time when the controlling switch is operated to its open position and cause the remote switch to be opened in response to these control currents. The remote switch may then be closed in response to power current supplied to the line when the controlling switch is closed.

In this way the necessity for continuously supplying control current to the remote control device when the controlling switch is closed is eliminated, a current impulse supplied for a short interval when the controlling switch is opened being sufficient for the purpose. Thus a very substantial economy in the cost of supplying the control current may be effected.

The novel features which I believed to be characteristic of my invention are set forth with particularity in the appended claims. My invention itself, however, both as to its organization and method of operation together with further objects and advantages thereof may best be understood by reference to the following description taken in connection with the accompanying drawing in which the single figure represents an embodiment of my invention.

Referring to the drawing in which I have conventionally illustrated a portion of a power distribution system comprising a supply bus 1 which is energized from a source of electromotive force 2 and which is connected to a load or distribution network 3 through switches 4 and 5 and the interconnecting line or feeder circuit 6. For purposes of illustration this circuit is represented as of the polyphase type including the usual network transformer 7 although it will, of course, be understood that my invention is applicable to any other type of circuit.

In a particular installation there may be a large number of lines such as the feeder circuit 6 interconnecting the bus 1 and the distribution network 3.

The switch 4 is provided with a closing coil 8 which is energized from a power line on the side of the switch opposite to the load or network 3 through a circuit which includes normally closed contacts on relay 9. The switch is also provided with a latching member 10 which is arranged to hold the switch in its closed position against the action of the biasing spring 11 by means of which the switch is biased to its open position. The latching member 10 is arranged to be engaged by the armature of the trip coil 8' thereby to release the switch and permit it to operate to its open position when the trip coil is energized. This trip coil is energized from the power circuit through a circuit which includes normally open contacts on the relay 9.

At 12 I have conventionally represented a source of high frequency oscillations, the output of which may be connected through contacts on relay 13 and coupling condensers 14 to the line 6. The output currents from the source 12 thus flow over the line to a high frequency receiver 15 at the location of the switch 4. This receiver may be of the electron discharge type commonly employed in a carrier current system or it may comprise a simple relay which may be either electrically, or mechanically, tuned to respond to the frequency of currents supplied to the control source 12. The receiver is connected to the line through coupling condensers 16 in the usual way.

The winding of relay 13 is arranged to be energized through a pair of interlocks 17 and 17' which are operatively connected to the switch 5 and so arranged that when the switch is opened the two interlocks 17 and 17' will momentarily occupy their closed position, thereby causing energization of the winding of relay 13, whereas at all other times the series circuit through the two interlocks is open. The switch 5 may of course be an oil circuit breaker which is controlled either automatically or manually by means not shown.

A better understanding of my invention may be had by reference to its operation. When the switch 5 is closed power currents will be supplied through the line, including transformer 7, or other translating device, to the secondary circuit thereof, and thence to the closing coil 8 of the switch 4, thereby causing that switch to close and supply current from the secondary of the transformer to the network 3. When the switch 5 is opened for any cause power currents will flow back through the network 3 from other power lines and units which are connected thereto and thence through the switch 4 and the closing coil 8, thereby maintaining that coil energized.

In accordance with my invention a control current impulse from the source 12 is supplied to the line and to the control current responsive device 15, 9 thereby to interrupt the circuit of the closing coil 8 and to close the circuit of the tripping coil 8'. The switch 4 will then be actuated to its open position by the bias spring 11.

The switch members 17 and 17' are connected by a resilient member 20, and are so arranged with respect to their respective cooperating contacts that the switch 17' is closed and switch 17 open when the switch 5 is closed, and switch 17 is closed and 17' open when the switch 5 is open. When the switch is operated to its open position the switch member 17 immediately engages its cooperating contacts. Switch member 17' will be held in engagement with its contacts by the time-responsive device 21. This device may comprise any suitable time-delay means such as a dashpot. During this time interval the winding of relay 13 is energized through the interlocks 17 and 17' and the output of the generator 12 is connected to the line thereby to supply control current to the receiver 15, 9. After a suitable predetermined time interval the resilient member 20 will actuate the member 17' out from engagement with its contacts, and thereby deenergize relay 13 and interrupt the supply of control current.

When the switch 5 is operated to its closed position interlock 17 will immediately disengage its contacts and interlock 17' will immediately engage its contacts, and the winding of relay 13 will therefore remain deenergized.

It will thus be seen that a control current impulse is supplied to the control current responsive device only when the oil switch 5 opens and not when it closes, the switch 4 being operated to its open position by this control current impulse.

Since the translating device 7 offers high impedance to the control current, this current will not reach the network in quantities sufficient to affect similar equipment which is associated with other feeder circuits supplying the same network. This feature of the system is enhanced by the fact that control currents flowing from one feeder circuit to another through the network must pass through the network transformer in both feeders.

While I have particularly mentioned the use of high frequency currents transmitted over the power line 6 to the control current responsive device 8, it will of course be apparent that these control currents may be supplied to the receiver through any suitable means as, for example, through neutral points of the Y of the three phase transformers, if such are employed in the circuit, as shown for example in German Patent No. 271,580.

By the term "control current" as used in this specification I refer to electrical conditions in the control circuit i. e. the circuit extending from the control source 12 to the remote point, and which is provided for the primary purpose of effecting desired control operations. By the term "power current" I refer to an electrical condition in the power distribution system which is due to energy supplied thereto primarily to energize power apparatus.

While I have shown a particular embodiment of my invention it will of course be understood that I do not wish to be limited thereto since many modifications, both in the circuit arrangement and in the instrumentalities employed, may be made, and I therefore aim in the appended claims to cover all such modifications as fall within the true scope and spirit of my invention.

What I claim as new and desire to secure by Letters Patent of the United States is:

1. In combination, a power source, a load, a line, switching means connecting said source and said line, switching means connecting said load and said line, means responsive to power current supplied to said line when said first means is in its closed position for closing said second switching means, control current responsive means for opening said second switching means, and means responsive to operation of said first switching means to its open position for supplying control current to said last means.

2. In combination, a pair of power circuits, a line interconnecting said circuits, a switch in said line, means responsive to power current supplied to said line for closing said switch, means for supplying control current to said line on the side of said switch nearer one of said circuits, and means responsive to said control current to open said switch independently of power current supplied to the line from the other circuit.

3. In combination a power source, a load, a line, switching means connecting said source to said line, switching means connecting said load to said line, a high frequency transmitter, a high frequency receiver, said transmitter and receiver being connected to said line at points between said switching means, means responsive to power current in the line when said first switching means is in its closed position for closing said second switching means, means responsive to operation of said first switching means to its open position for causing said transmitter to supply carrier current to the line for a predetermined time interval, and means controlled by said receiver for opening said second switching means.

4. In combinaton, a power source, a load, a line, switching means, connecting said source and said line, switching means connecting said load and said line, means responsive to power current received from the line between said switching means for closing said second switching means, means responsive to operation of said first switching means to its open position for supplying control current to the line for a predetermined time interval and unresponsive to operation of said first switching means to its closed position to supply control current to the line, and means responsive to said control current to open said second switching means.

5. In combination, a power source, a load, a line, switching means connecting said source and said line switching means connecting said load and said line, means responsive to power current in the line to close said second switching means, means responsive to control current to open said second switching means, a control current source, a circuit including a relay for controlling said source, a pair of switches in said circuit operatively connected to said first switching means, and arranged to maintain said circuit normally open when said switching means is in either position, means for delaying operation of one of said switches thereby to cause said circuit to be closed for a predetermined interval when said first switching means is operated to its open position thereby to supply control current to said responsive means.

6. In combination, a control station, a power line, a switch in said line at a point remote from the control station, means at the control station for controlling the energization of the power line, means responsive to energy in said line to operate the switch to one position, means responsive to control current to operate said switch to another position, and means at the control station responsive to operation of said first means to deenergize the line of supply control current to said last means.

In witness whereof, I hereunto set my hand this 15th day of April, 1929.

BENJAMIN W. JONES.

CERTIFICATE OF CORRECTION.

Patent No. 1,879,292.　　　　　　　　　　　September 27, 1932.

BENJAMIN W. JONES.

It is hereby certified that error appears in the printed specification of the above numbered patent requiring correction as follows: Page 3, line 66, claim 6, for the word "of" second occurrence, read to; and that the said Letters Patent should be read with this correction therein that the same may conform to the record of the case in the Patent Office.

Signed and sealed this 29th day of November, A. D. 1932.

(Seal)

M. J. Moore,
Acting Commissioner of Patents.